(12) United States Patent
Tilotson

(10) Patent No.: US 9,979,335 B1
(45) Date of Patent: May 22, 2018

(54) SYSTEM INCLUDING LIGHT EMITTING SEMICONDUCTORS FOR DISSIPATING POWER

(71) Applicant: The Boeing Company, Chicago, IL (US)

(72) Inventor: Brian J. Tilotson, Kent, WA (US)

(73) Assignee: The Boeing Company, Chicago, IL (US)

( * ) Notice: Subject to any disclaimer, the term of this patent is extended or adjusted under 35 U.S.C. 154(b) by 0 days. days.

(21) Appl. No.: 15/644,060

(22) Filed: Jul. 7, 2017

(51) Int. Cl.
*H02P 6/00* (2016.01)
*H02P 7/29* (2016.01)
*H05B 33/08* (2006.01)
*H01F 7/06* (2006.01)
*H02P 7/03* (2016.01)

(52) U.S. Cl.
CPC .............. *H02P 7/29* (2013.01); *H01F 7/064* (2013.01); *H05B 33/0842* (2013.01); *H02P 7/04* (2016.02)

(58) Field of Classification Search
CPC ...... H02P 1/00; H02P 3/00; H02P 6/00; H02P 23/00; H02P 6/14; G05B 11/28; H02B 1/20
USPC .......... 318/400.01, 700, 701, 726, 727, 280, 318/266, 466, 430, 432, 437, 400.29; 362/612, 555; 438/457
See application file for complete search history.

(56) References Cited

U.S. PATENT DOCUMENTS 4,786,822 A * 11/1988 Steely .................. H02H 7/0844
307/125

* cited by examiner

*Primary Examiner* — Antony M Paul
(74) *Attorney, Agent, or Firm* — Thompson Hine LLP

(57) ABSTRACT

A circuit is disclosed. The circuit includes an inductive load, at least one electrical component in communication with the inductive load, and a semiconductor. The semiconductor is configured to emit light in response to a voltage drop across the semiconductor being at least equal to a forward voltage, wherein the semiconductor is placed in parallel with the electrical component and emits the light in response to the inductive load generating a voltage spike during operation that causes the voltage drop across the semiconductor to be at least equal to the forward voltage.

20 Claims, 2 Drawing Sheets

SYSTEM INCLUDING LIGHT EMITTING SEMICONDUCTORS FOR DISSIPATING POWER

FIELD

The disclosed system and method relates to a system for dissipating power and, more particularly, to a circuit for dissipating power that includes a semiconductor that emits light.

BACKGROUND

There are two main types of linear actuators, namely fluid power actuators that operate on differential pressure and electromechanical actuators driven by an electric motor. Electromechanical actuators may be back-driven or self-locking. If an electromechanical actuator is self-locking, then the actuator may not be back-driven by exerting a force on the output. Many aerospace vehicles employ back-driven actuators. The actuators are typically back-driven when a stream of air exerts a force that causes a spoiler that is presently deployed to retract.

The electrical power created by back-driving is conventionally dissipated by elements such as resistors and diodes. In one example, a direct current (DC) motor is back-driven by an H-bridge circuit. An H-bridge circuit is a type of electronic circuit that enables a voltage to be applied across the DC motor in either direction. In the example as described, diodes are used to dissipate the electrical power and to protect other electrical components included in the H-bridge circuit. Specifically, the H-bridge circuit includes transistors that switch rapidly based on a pulse-width modulation (PWM) scheme. The PWM scheme controls either speed or torque of the DC motor. When the transistors are switched off and the supply current to the DC motor is suddenly interrupted, a voltage spike is created since the DC motor is an inductive load. The voltage spike may be referred to as flyback, and the diodes in the H-bridge are used to protect the transistors from the flyback created by the pulsing of the DC motor. The diodes generate heat when dissipating electrical power. Furthermore, the heat created by the diodes rises in response to the pulse rate of the PWM scheme increasing. Moreover, the heat created by the diodes needs to be disposed.

It may be challenging to dispose of the heat generated by the diodes. In fact, heat generation in aerospace application is especially problematic because the components of the vehicle are required to operate within specific temperature ranges during all mission phases. The challenges faced with heat dissipation in an aerospace vehicle may be further compounded since aerospace vehicles also encounter relatively high aerodynamic forces during operation. This results in more work that needs to be performed by an actuator in order to move a surface. Moreover, the actuators are also usually required to operate at very high rates such as, for example, over 100,000 Hertz. Finally, since aerospace vehicles travel at high speeds through space, the air surrounding the space vehicle is already at an elevated temperature. Thus, it may not be possible to release most of the heat generated by the diodes.

SUMMARY

The disclosed system provides an approach for dissipating power by a semiconductor that emits light in response to an inductive load generating a voltage spike that causes a voltage drop across the semiconductor to be at least equal to a forward voltage. The light emitting semiconductor generates less heat when compared to other devices such as resistors or diodes.

In one example, a circuit is disclosed. The circuit includes an inductive load, at least one electrical component in communication with the inductive load, and a semiconductor. The semiconductor is configured to emit light in response to a voltage drop across the semiconductor being at least equal to a forward voltage. The semiconductor is placed in parallel with the electrical component and emits the light in response to the inductive load generating a voltage spike during operation that causes the voltage drop across the semiconductor to be at least equal to the forward voltage.

In another example, a circuit is disclosed. The circuit includes an inductive load and a flyback semiconductor in parallel with the inductive load. The flyback semiconductor is configured to emit light in response to a voltage drop across the flyback semiconductor being at least equal to a forward voltage. The flyback semiconductor emits the light in response to the inductive load generating a voltage spike during operation that causes the voltage drop across the flyback semiconductor to be at least equal to the forward voltage.

In yet another example, a method for dissipating power is disclosed. The method includes driving an inductive load of a circuit, wherein the circuit includes at least one electrical component in communication with the inductive load. The method also includes generating a voltage spike during operation of the inductive load that causes a voltage drop across a semiconductor to be at least equal to a forward voltage. The semiconductor is placed in parallel with the at least one electrical component. Finally, the method includes emitting light by the semiconductor in response to the voltage drop across the semiconductor being at least equal to the forward voltage.

Other objects and advantages of the disclosed method and system will be apparent from the following description, the accompanying drawings and the appended claims.

DETAILED DESCRIPTION

Figure 1:
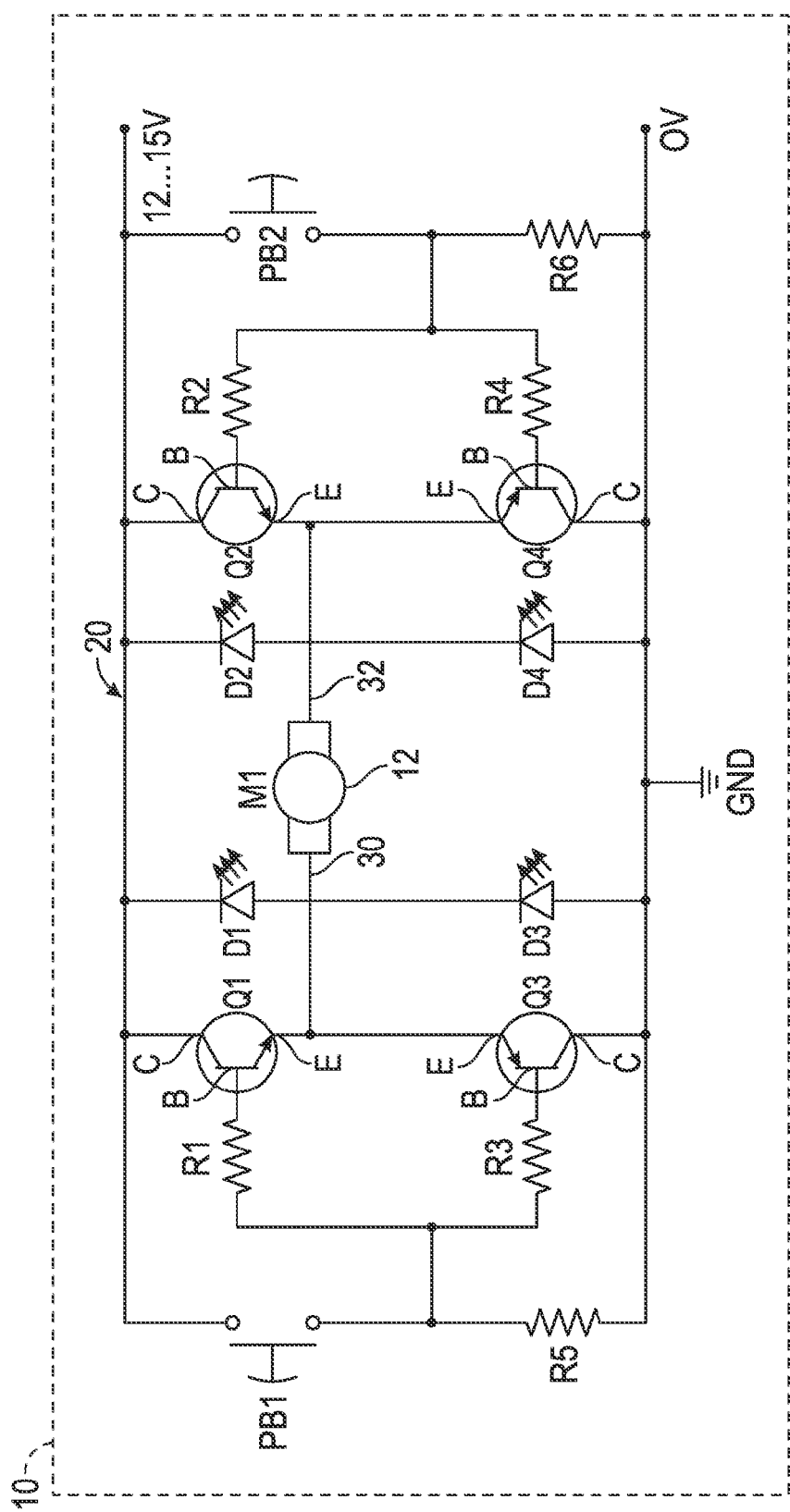
FIG. 1 is an exemplary schematic diagram of the disclosed circuit for an actuator, where the disclosed circuit is an H-bridge that includes a plurality of light emitting diodes (LEDs) for protecting the transistors.

FIG. 1 is an exemplary schematic block diagram of an actuator 10 including the disclosed circuit 20 for powering an inductive load 12. In the exemplary embodiment as shown, the inductive load 12 is a back-driven direct current (DC) motor 12, and the circuit 20 is an H-bridge circuit 20. As explained in greater detail below, the H-bridge circuit 20 includes at least one electrical component in communication with the DC motor 12. The at least one electrical component is a plurality of transistors Q1-Q4. The H-bridge circuit 20 also includes a semiconductor configured to emit light in response to a voltage drop across the semiconductor being at least equal to a forward voltage. In the embodiment as shown, the semiconductor is a light emitting diode (LED), and is illustrated as a plurality of LEDs D1-D4.

The LEDs D1-D4 are each placed in parallel with a corresponding one of the transistors Q1-Q4. Specifically, LED D1 is in parallel with transistor Q1, LED D2 is in parallel with transistor Q2, LED D3 is in parallel with transistor Q3, and LED D4 is in parallel with transistor Q4. The LEDs D1-D4 are configured to emit light in response to the DC motor 12 generating a voltage spike during operation. The voltage spike causes the voltage drop across each LED D1-D4 to be at least equal to the forward voltage. The H-bridge circuit 20 also includes a first pushbutton PB1, a second pushbutton PB2, a resistor R1, a resistor R2, a resistor R3, a resistor R4, a resistor R5, and a resistor R6.

As explained below, the LEDs D1-D4 are used as flyback diodes or snubber diodes to protect the transistors Q1-Q4 from excess voltage or voltage spikes that sometimes occur during operation of the DC motor 12. Specifically, the LEDs D1-D4 dissipate a portion of the excess voltage by emitting light, while the remaining power is dissipated as heat. Although LEDs are illustrated, the circuit 20 is not limited to the embodiment as shown in FIG. 1. Instead, in another embodiment the circuit 20 includes any semiconductor configured to emit light when forward-biased such as laser diodes or photocells. In particular, in one embodiment the circuit 20 includes single-junction photocells for dissipating a portion of the excess voltage by emitting light.

The transistors Q1-Q4 control a polarity of a supply current to the DC motor 12. In the example as shown in FIG. 1, the transistors Q1-Q4 are illustrated as bipolar junction transistors (BJTs), however other types of transistors may be used as well such as, for example, metal-oxide-semiconductor field-effect transistors (MOSFETs). Each transistor Q1-Q4 includes a base B, an emitter E, and a collector C. The resistors R1-R4 are each provided to limit the current that enters the base B of a corresponding one of the transistors Q1-Q4. Specifically, the resistor R1 corresponds to transistor Q1, the resistor R2 corresponds to transistor Q2, the resistor R3 corresponds to transistor Q3, and the resistor R4 corresponds to transistor Q4. The resistor R5 is a pull-down resistor connected between ground GND and the pushbutton PB1. The resistor R6 is a pull-down resistor connected between the ground GND and the pushbutton PB2.

In one embodiment, when transistors Q1 and Q4 are activated or closed and the transistors Q2 and Q3 are opened, then a rotor (not shown) of the DC motor 12 turns in a clockwise direction. Current flows from left to right in the DC motor 12, or in other words, positive voltage across terminals 30, 32. When transistors Q2 and Q3 are activated and the transistors Q1 and Q4 are opened, then the rotor of the DC motor 12 turns in a counterclockwise direction and current flows from right to left in the DC motor 12. If the terminals 30, 32 of the DC motor 12 are open, then the DC motor 12 freewheels. If the terminals 30, 32 are short circuited, then the DC motor 12 brakes.

The LEDs D1-D4 are used to substantially eliminate flyback, which is the sudden voltage spike seen across an inductive load such as the DC motor 12 when a supply current (not illustrated) is suddenly reduced or interrupted. The LEDs D1-D4 also protect against an over-driven or back-driven condition of the DC motor 12. In one embodiment, a torque or speed of the DC motor 12 is controlled based on pulse-width modulation (PWM), which causes the transistors Q1-Q4 to switch rapidly.

An over-driven motor condition occurs when an external torque is exerted upon a shaft of a motor. The external torque causes the motor to increase in speed, thereby increasing the electromotive force (EMF) across the terminals of the motor. The EMF increases and eventually becomes greater than a supply voltage, which reverse-biases the transistors included in the drive circuit of the motor. However, as explained below, the LED D1 becomes conductive once a voltage drop across the LED D1 is at a forward voltage, which diverts the current away from the emitter E of the transistor Q1. Similarly, the LED D4 also begins to conduct once the voltage drop across the LED D4 is at the forward voltage. Therefore, the LED D4 also diverts current away from the emitter E of the transistor Q4.

Continuing to refer to FIG. 1, once the pushbutton PB1 is depressed the transistor Q1 turns on and voltage on a positive side 30 of the DC motor 12 goes high. The DC motor 12 turns clockwise, and increases in speed. As the speed of the DC motor 12 increases, the voltage at the negative side 34 of the DC motor rises until the current to the DC motor 12 is about zero. Then, the external torque is exerted upon the motor shaft, causing the DC motor 12 to increase even more in speed.

In response to the voltage at the positive terminal 30 of the DC motor 12 increasing to a value greater than the supply voltage and the forward bias voltage of the LED D1, the LED D1 begins to conduct and current flows through the LED D1. The current then flows through the pushbutton PB1 and the resistor R5. Similarly, the LED D4 also begins to conduct current as well, since the voltage at the terminal 32 of the DC motor 12 is lower than the voltage at ground. Both the LEDs D1 and D4 conduct current and release energy in the form of photons, therefore creating light. Thus, a portion of the LEDs (D1 and D4) are activated in response to an over-driven condition of the DC motor 12 to divert current away from the transistors (Q1 and Q4) that correspond to the activated LEDs.

A back-driven motor condition occurs when an external torque is exerted upon a shaft of a motor in a direction that is opposite to the rotation of the shaft. The external torque causes the EMF to decrease and become negative in value. The faster the motor spins in the opposite direction, the more current is drawn which may damage the transistors. However, if the voltage at the terminal 30 of the DC motor 12 becomes lower than ground, minus the forward voltage of the LED D3, then the LED D3 begins to conduct, which diverts the current away from the emitter E of the transistor Q3. Similarly, the LED D2 also begins to conduct because the voltage at the terminal 32 of the DC motor 12 rises above the supply voltage. Therefore, the LED D2 also diverts current away from the emitter E of the transistor Q2. Thus, a portion of the LEDs (D2 and D3) are activated in response to a back-driven condition of the DC motor 12 to divert current away from the transistors (Q2 and Q3) that correspond to the activated LEDs.

Continuing to refer to FIG. 1, once the pushbutton PB1 is depressed the transistor Q1 turns on and voltage on a positive side 30 of the DC motor 12 goes high. The DC motor 12 turns clockwise, and increases in speed. As the speed of the DC motor 12 increases, the voltage at the negative side 34 of the DC motor rises until the current to the DC motor 12 is about zero. Then, the external torque is exerted upon the motor shaft, causing the DC motor 12 to increase even more in speed.

In response to the voltage at the positive terminal 30 of the DC motor 12 increasing to a value greater than the supply voltage and the forward bias voltage of the LED D1, the LED D1 begins to conduct and current flows through the LED D1. The current then flows through the pushbutton PB1 and the resistor R5. Similarly, the LED D4 also begins to conduct current as well, since the voltage at the terminal 32 of the DC motor 12 is lower than the voltage at ground. Both the LEDs D1 and D4 conduct current and release energy in the form of photons, therefore creating light.

The forward voltage of an LED is between 1.8 and 3.3 volts, and varies based on the color of the LED. For example, the forward voltage of a red LED is about 1.8 volts. The forward voltage rises as the light frequency increases. Thus, the forward voltage of a blue LED ranges from about 3 to 3.3 volts. However, the forward voltage of the LEDs is kept as low as possible, since the lower the forward voltage, the less power that is dissipated. Furthermore, in applications having flyback current, a lower voltage drop across the LED results in a larger voltage across the inductive elements of the load. Thus, the flyback current drops to zero more quickly, and means that the load is more responsive.

In contrast to conventional electronic components used to dissipate power such as resistors and diodes, the LEDs D1-D4 do not dissipate power only as heat. Instead, a portion of the power in the LEDs D1-D4 are dissipated as light. In one embodiment, the light created by the LEDs D1-D4 consumes about 30% of the power dissipated. Therefore, the LEDs D1-D4 dissipate only about 70% of the heat that a conventional diode would create in the same application. However, the light created by a red LED consumes about 39% of the power dissipated. Furthermore, the light emitted by a laser diode consumes about 50% of the power dissipated. Therefore, in some types of heat sensitive applications a laser diode or a red LED are utilized.

In some embodiments, the LEDs D1-D4 are not placed in an enclosure with the circuit 20. Instead, the LEDs D1-D4 may be mounted behind a window (not illustrated) so that the emitted light is released into the environment. In another embodiment, the LEDs D1-D4 are mounted upon an external surface of a vehicle, such as a space vehicle (not illustrated). Thus, any light produced by the LEDs D1-D4 is released into the environment, and any heat is transferred to the external skin of the space vehicle.

Figure 2:
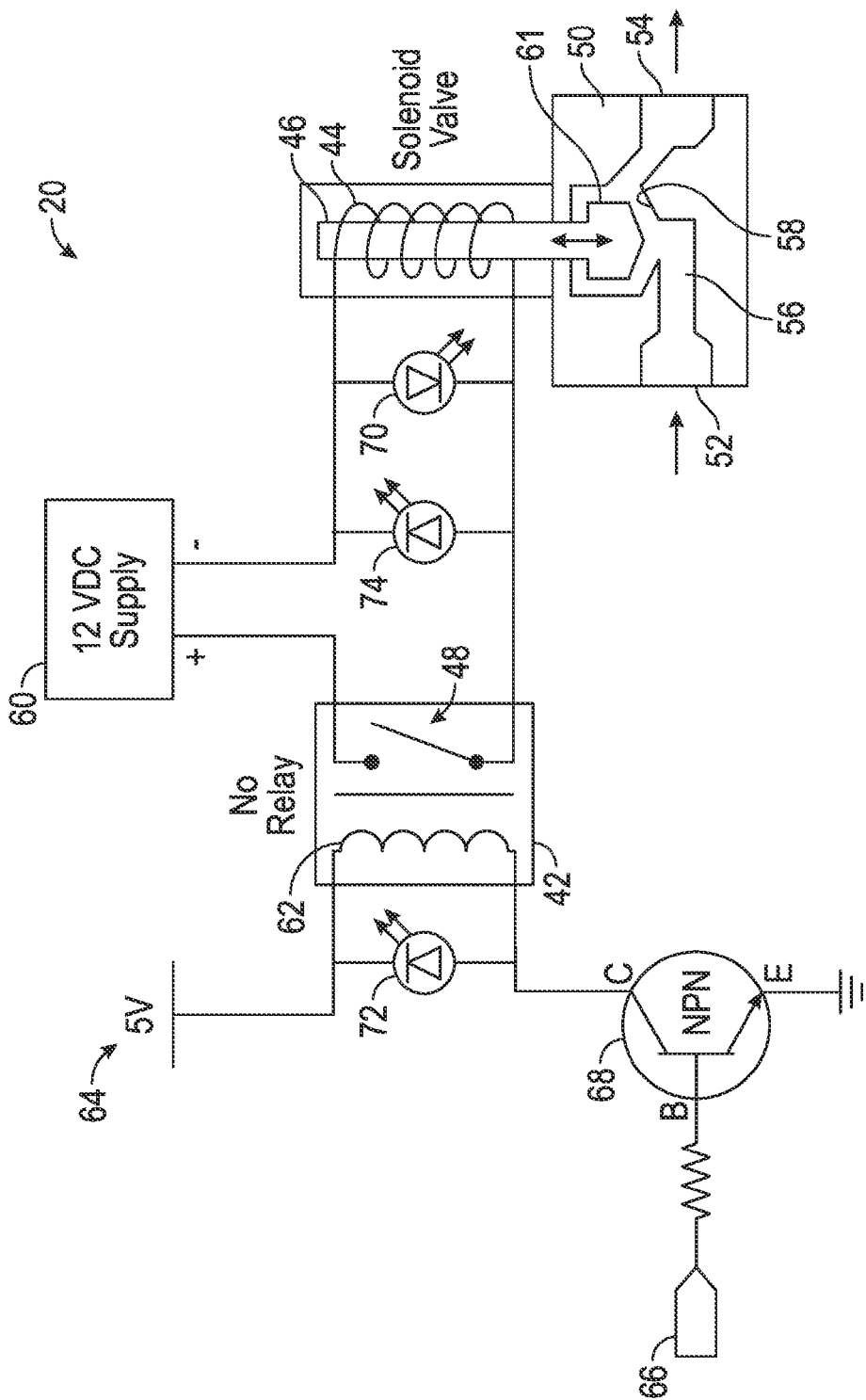
FIG. 2 is an exemplary schematic diagram of the inductive load as either a relay or a solenoid valve.

Although FIG. 1 illustrates an H-bridge powering a back-driven DC motor, the disclosure is not limited to the embodiment as shown in FIG. 1. For example, FIG. 2 illustrates the circuit 20 including two inductive loads, namely a normally open (NO) relay 42, which is configured to control a solenoid valve 40. The solenoid valve 40 is illustrated in an open position. The relay 42 controls the solenoid valve 40. Specifically, the relay 42 actuates the solenoid valve 40 between the open position and a closed position. The solenoid valve 40 includes a coil 44, an armature 46, and a valve body 50. The valve body 50 of the solenoid valve 40 defines an inlet 52, an outlet 54, and a passageway 56 that extends between the inlet 52 and the outlet 54. The passageway 56 allows for a fluid such as water to enter the solenoid valve 40 through the inlet 52. When the solenoid valve 40 is opened, the fluid is allowed to exit the solenoid valve 40 through the outlet 54. The armature 46 of the solenoid valve 40 is normally in the closed position, where an end 61 of the armature 46 is seated against a surface 58 defined by the passageway 56 of the valve body 50. When seated, the armature 46 blocks the flow of fluid through the passageway 56 of the valve body 50.

Continuing to refer to FIG. 2, the coil 44 of the solenoid valve 40 is in communication with a power supply 60. In the exemplary embodiment as shown, the power supply 60 is a 12 Volt power supply. The relay 42 is in communication with the power supply 60, a power source 64, and a transistor 68. In the embodiment as shown, the relay 42 is a single pole single throw normally open relay including a relay coil 62 and a switch 48. However, the relay 42 is not limited to the specific embodiment as shown in FIG. 2. The transistor 68 includes an emitter E, a base B, and a collector C, where the base B of the transistor 68 is in communication with a digital output pin 66 of a digital controller (not illustrated). Although the transistor 68 is shown as a BJT, other types of transistors may be used as well. The digital output pin 66 transmits a control signal to switch the relay 42 into a closed position.

In response to energizing the relay coil 62 of the relay 42, the switch 48 of the relay 42 is closed. Thus, current may flow from the 12V supply through the coil 44 of the solenoid valve 40. When the solenoid coil 44 is energized, the solenoid valve 40 opens, and allows for fluid to flow through the passageway 56 of the valve body 50.

A flyback semiconductor 70 is placed in parallel with the solenoid valve 40. Similar to the embodiment as shown in FIG. 1, an LED is illustrated, however other types of light emitting semiconductors such as single-junction photocells and laser diodes may be used as well. The flyback semiconductor 70 substantially eliminates the flyback created by the solenoid valve 40. The flyback semiconductor 70 also protects various electrical components of the circuit 20 from a back-driven condition of the solenoid valve 40. A back-driven condition occurs when current flows through the coil 44 of the solenoid valve 40, but a greater opposite external force is exerted upon the armature 46. That is, the coil 44 is energized to open the solenoid valve 40, but a greater force is exerted upon the armature 46 to keep the solenoid valve 40 closed. A second flyback semiconductor 72, which is illustrated as an LED, is also placed in parallel with the relay 42 to substantially eliminate flyback as well.

Finally, an antiparallel semiconductor 74 is provided. The antiparallel semiconductor 74 is placed within the circuit 20 with respect to the flyback semiconductor 70. The antiparallel semiconductor 74 is configured to protect against an over-driven condition of the solenoid valve 40. An over-driven condition occurs when current flows through the coil 44 of the solenoid valve 40, but a greater external force that is exerted in the same direction is also exerted upon the armature 46.

Referring generally to the figures, the disclosed system provides one or more light emitting semiconductor components for dissipating power, which generate less heat than a conventional diode would create in the same application. In the event the disclosure is employed in an aerospace application, technical effects and benefits may include actuators that are capable of retracting at full speed, reduced weight when compared to fast-charged batteries, and smaller heat sinks when compared to a resistor-only system. Specifically, the heat sinks may be up to 30 to 35 percent smaller when compared to resistor-only systems. Therefore, the disclosure provides enhanced actuator performance and decreased weight, which may be especially important in applications such as aerospace vehicles.

While the forms of apparatus and methods herein described constitute preferred examples of this invention, it is to be understood that the invention is not limited to these precise forms of apparatus and methods, and the changes may be made therein without departing from the scope of the invention.

What is claimed is:
1. A circuit (20), comprising:
    an inductive load (12);
    at least one electrical component (Q1-Q4) in communication with the inductive load (12); and
    a semiconductor (D1-D4) configured to emit light in response to a voltage drop across the semiconductor

(D1-D4) being at least equal to a forward voltage, wherein the semiconductor (D1-D4) is placed in parallel with the at least one electrical component (Q1-Q4) and emits the light in response to the inductive load (12) generating a voltage spike during operation that causes the voltage drop across the semiconductor (D1-D4) to be at least equal to the forward voltage.

2. The circuit (20) of claim 1, wherein the at least one electrical component (Q1-Q4) is a transistor.

3. The circuit (20) of claim 2, wherein the transistor includes a base (B), a collector (C), and an emitter (E), and wherein the semiconductor (D1-D4) diverts current away from the emitter (E) of the transistor.

4. The circuit (20) of claim 1, wherein the circuit (20) is an H-bridge circuit and the inductive load (12) is a direct current (DC) motor.

5. The circuit (20) of claim 4, comprising a plurality of transistors and a plurality of light emitting diodes (LEDs), wherein each of the plurality of transistors is placed in parallel with one of the plurality of LEDs.

6. The circuit (20) of claim 1, wherein the semiconductor (D1-D4) is a LED.

7. The circuit (20) of claim 1, wherein the semiconductor (D1-D4) is either a laser diode or a single-junction photocell.

8. The circuit (20) of claim 1, wherein a torque or a speed of the inductive load (12) is controlled based on pulse-width modulation (PWM).

9. A circuit (20), comprising:
an inductive load (40); and
a flyback semiconductor (70) in parallel with the inductive load (40), wherein the flyback semiconductor (70) is configured to emit light in response to a voltage drop across the flyback semiconductor (70) being at least equal to a forward voltage, wherein the flyback semiconductor (70) emits the light in response to the inductive load (40) generating a voltage spike during operation that causes the voltage drop across the flyback semiconductor (70) to be at least equal to the forward voltage.

10. The circuit (20) of claim 9, wherein the inductive load (40) is a solenoid valve.

11. The circuit (20) of claim 9, comprising a relay (42) configured to control the inductive load (40).

12. The circuit (20) of claim 11, comprising a second flyback semiconductor (72) placed in parallel with the relay (42), wherein the second flyback semiconductor (72) is a light emitting diode (LED).

13. The circuit (20) of claim 9, comprising an antiparallel semiconductor (74) placed within the circuit (20) with respect to the flyback semiconductor (70), wherein the antiparallel semiconductor (74) is a LED.

14. The circuit (20) of claim 9, wherein the flyback semiconductor (70) is an LED.

15. The circuit (20) of claim 9, wherein the flyback semiconductor (70) is either a laser diode or a single-junction photocell.

16. A method for dissipating power, comprising:
driving an inductive load (12) of a circuit (20), wherein the circuit (20) includes at least one electrical component (Q1-Q4) in communication with the inductive load (12);
generating a voltage spike during operation of the inductive load (12) that causes a voltage drop across a semiconductor (D1-D4) to be at least equal to a forward voltage, wherein the semiconductor (D1-D4) is placed in parallel with the at least one electrical component (Q1-Q4); and
emitting light by the semiconductor (D1-D4) in response to the voltage drop across the semiconductor (D1-D4) being at least equal to the forward voltage.

17. The method of claim 16, comprising providing a plurality of light emitting diodes (D1-D4) and a plurality of transistors (Q1-Q4).

18. The method of claim 17, comprising activating a portion of the plurality of LEDs (D1, D4) in response to an over-driven condition of the inductive load (12) to divert current away from a portion of the plurality of transistors (Q1, Q4) that correspond to the portion of the plurality of LEDs (D1, D4) that are activated.

19. The method of claim 17, comprising activating a portion of the plurality of LEDs (D2, D3) in response to a back-driven condition of the inductive load (12) from a portion of the plurality of transistors (Q2, Q3) that correspond to the portion of the plurality of LEDs (D2, D3) that are activated.

20. The method of claim 16, wherein the circuit (20) is an H-bridge circuit and the inductive load (12) is a direct current (DC) motor.

* * * * *